United States Patent

[11] 3,614,747

[72] Inventors Koichiro Ishihara; Tetsunori Nishimoto, both of Hatano-shi, Japan

[21] Appl. No. 872,065
[22] Filed Oct. 29, 1969
[45] Patented Oct. 19, 1971
[73] Assignee Hitachi, Ltd. Tokyo, Japan
[32] Priority Oct. 31, 1968
[33] Japan
[31] 43/79553

[54] INSTRUCTION BUFFER SYSTEM
13 Claims, 5 Drawing Figs.

[52] U.S. Cl. .......... 340/172.5
[51] Int. Cl. .......... G06f 9/00
[50] Field of Search .......... 340/172.5

[56] References Cited

UNITED STATES PATENTS

| | | | |
|---|---|---|---|
| 3,292,155 | 12/1966 | Neilson | 340/172.5 |
| 3,348,211 | 10/1967 | Ghiron | 340/172.5 |
| 3,408,630 | 10/1968 | Packard et al. | 340/172.5 |
| 3,480,917 | 11/1969 | Day | 340/172.5 |
| 3,490,005 | 1/1970 | Anderson et al. | 340/172.5 |

*Primary Examiner*—Paul J. Henon
*Assistant Examiner*—Ronald F. Chapuran
*Attorney*—Craig, Antonelli & Hill

ABSTRACT: An instruction buffer for electronic computer systems, mainly comprising a pair of groups of registers in which instructions read out from the memory unit are stored and a control unit for controlling the selection of said groups of registers, normally one group of registers being used and the second group being used when a conditional branch instruction occurs in the program, so as to store the instructions in the branch program, the subsequent use of the groups of registers depending on the fate of the branch condition, thereby the advanced control of readout being possible throughout the program, ensuring a high-speed operation.

INVENTORS

KOICHIRO ISHIHARA and TETSUNORI NISHIMOTO

BY Craig, Antonelli, Stewart & Hill

ATTORNEYS

INVENTORS

KOICHIRO ISHIHARA and TETSUNORI NISHIMOTO

BY

Craig, Antonelli, Stewart & Hill

ATTORNEYS

INVENTORS

KOICHIRO ISHIHARA and TETSUNORI NISHIMOTO

BY Craig, Antonelli, Stewart & Hill

ATTORNEYS

INSTRUCTION BUFFER SYSTEM

This invention relates to an electronic computer, more particularly to an instruction buffer system which is used for the advanced control of a high-speed computer.

In an electronic computer, an instruction of the program is executed in the following order:

Step 1. The address of the instruction in a memory is designated;

Step 2. The instruction is read out from the memory in accordance with the address;

Step 3. The address part of the instruction is modified and an address of an operand in a memory is designated;

Step 4. The operand is read out from the memory; and

Step 5. The operation is executed according to the instruction.

Of the above steps, steps 1, 3 and 5 are executed in the central processor while steps 2 and 4 are carried out in the memory. Recent progress in the semiconductor circuit techniques and the resultant development of miniaturized high-speed logic circuits have made it possible for the central processor to be operated at a high speed. Thus, the time required for the execution of the above step 1 or 3 can be reduced to several tens of nano seconds ($10^{19}$ second), while the time necessary for the step 5 ranges from several tens of nano seconds to several tens of microseconds depending on the nature of the instructions.

On the other hand, the step 2 or 4 takes several hundreds of nano seconds, occupying a considerable part of the process time of an instruction. Therefore, it can be said that the overall operation speed of an electronic computer greatly depends on the process speed in the memory.

In order to make up the difference in the process speed between the central processor and the memories, so-called advanced control has been adopted, with which the readout of an instruction is started immediately after the preceding readout of instruction, not awaiting the completion of execution of the preceding instruction, so that the above-mentioned steps 1, 2, 3 and 4 are carried out as fast as possible. In the advanced control, the sequentially readout instructions are stored in a register called an instruction buffer.

A problem involved with the instruction buffer is how a conditional branch in a programmed instruction should be handled. In a conditional branch, it is not settled until the completion of the execution of the instruction whether the branch condition is fulfilled or not. In the conventional system, therefore, a separated register is provided for storing the instruction at the address of the branch so that an advanced control is possible even when the branch condition is fulfilled.

Further, if a conditional branch returns to a very near (for example, within eight double words) program instruction, forming a small loop of program, it will be effective to hold the whole instructions in the loop in registers so that the processing is performed only with the instructions stored in the registers until the above branch condition becomes unfulfilled. For the purpose of effecting such an operation, the conventional instruction buffer is provided with registers having a capacity sufficient for storing the above-mentioned small loop and a few registers for storing the instructions at the address of the branch when a conditional branch occurs.

However, the conventional instruction buffer has two serious disadvantages as follows: (1) The small capacity of the registers for storing the instructions at the addresses of branch necessitates a delay in the processing when the branch condition is fulfilled. (2) It requires capacity of registers as large as eight double words or so to accommodate the whole instructions in a loop, though a capacity for four double words or so is sufficient for the ordinary process.

The main object of this invention is to provide an instruction buffer which allows the electronic computer to operate at a higher speed.

Another object of this invention is to provide an instruction buffer which enables the computer to operate at undiminished speed even when the branch condition is fulfilled in the execution of a conditional branch instruction.

A further object of this invention is to provide a control system which enables the instruction buffer to store a loop of program when such a loop occurs in the program.

Therefore, the instruction buffer means of this invention comprises a pair of symmetrical instruction storage means for storing instructions read out from a memory unit in a selected one of said pair of instruction storage means until said instructions are taken out to be processed at the central processor; buffer control means for designating a first one of said pair of storage means for storing an instruction read out from the memory but designating the second one of said pair of storage means for storing an instruction at the address of branch read out from the memory when the central processor detects an instruction taken out from said first storage means to be a conditional branch instruction, said buffer control means selecting said second or first storage means depending on whether the branch condition of said conditional branch instruction is fulfilled or not; means for successively writing instructions read out from the memory unit into the storage means selected under the control of said buffer control means; and read out means for taking out said instructions from said selected storage means to transfer them to the central processor. This invention will be described in detail in connection with embodiments of the invention and with reference to the accompanying drawings in which;

Figure 1:
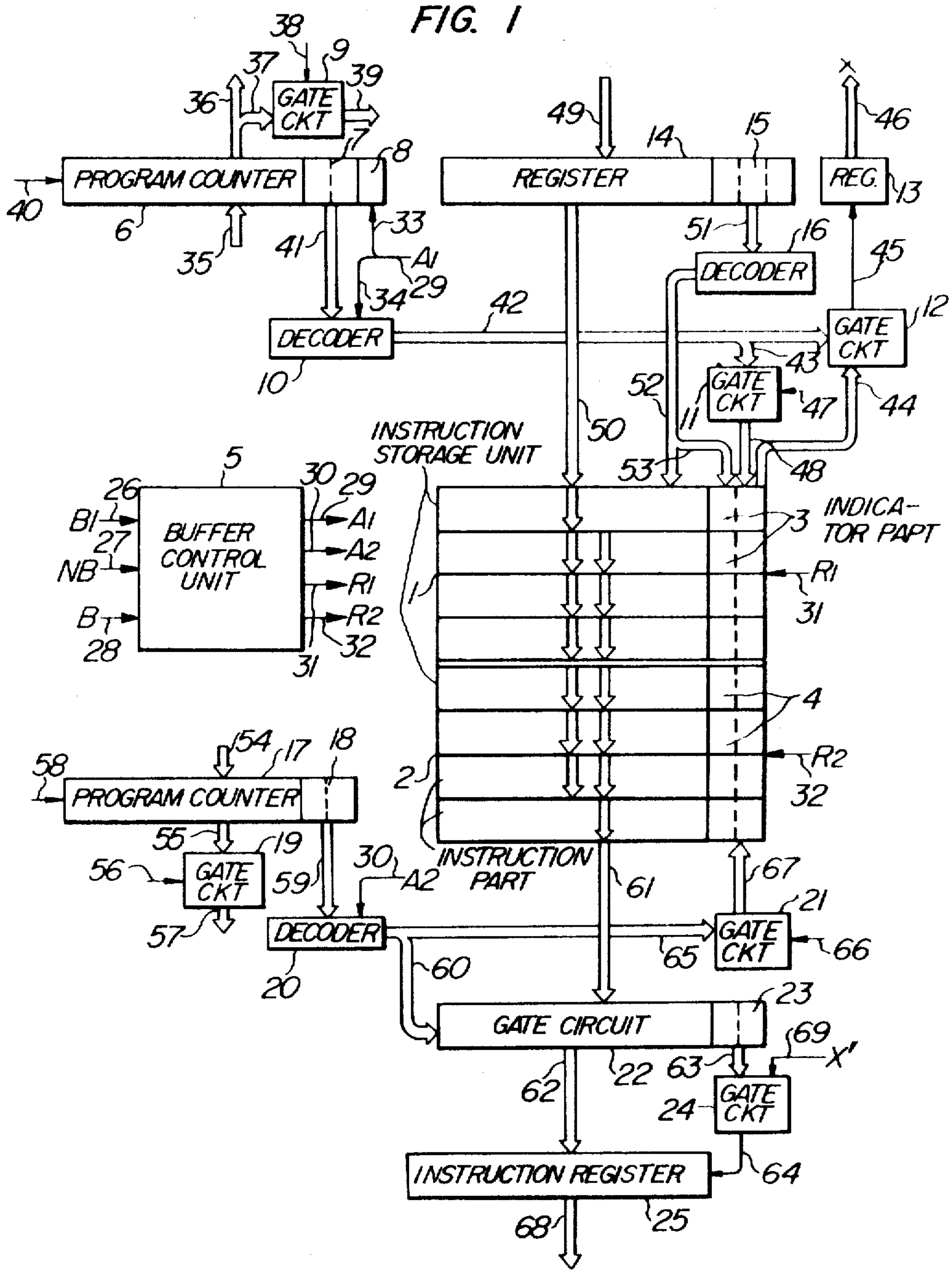
FIG. 1 is a schematic diagram showing the constitution of an embodiment of this invention.

Referring to FIG. 1, reference numerals 1 and 2 designate a pair of instruction storage units, each of which consists of four registers, each register including an instruction part accommodated for double words and an indicator part 3 or 4 of two bits. Numeral 5 designates a buffer control unit which may receive signals BI, NB and B from the central processor (not shown) respectively through lines 26, 27 and 28, the signal BI appearing when a conditional branch instruction is decoded at the central processor, the signal NB indicating that the branch condition was not fulfilled, and the signal B indicating the fulfillment of the branch condition. The buffer control unit 5 produces signals $A_1$, $A_2$, $R_1$ and $R_2$ respectively on lines 29, 30, 31 and 32, the signal $A_1$ indicating which of the instruction storage units 1 and 2 is selected for storing instructions read out from a memory, the signal $A_2$ indicating an instruction storage unit 1 or 2 from which the stored instructions should be read out, and the signals $R_1$ and $R_2$ being reset signals respectively for the indicator parts 3 and 4 of the instruction storage units 1 and 2.

Reference numeral 6 designates a program counter which indicates the address of an instruction to be read out from a memory unit (not shown). The program counter 6 has, in the right of least significant two bits 7, a portion 8 for setting the above-mentioned signal $A_1$ which is transferred to the memory unit along with the address through line 36.

Numeral 14 designates a register for storing an instruction of double words transferred from the memory unit through line 49, of which portion 15 accommodates the least significant two bits of the address of the instruction returned from the memory and the signal $A_1$ indicating the instruction storage means in which said instruction is to be stored. It will be needless to mention that said portion 15 of the register 14 corresponds to the portions 7 and 8 of said program counter 6. The portion 15 indicates the address of a register of the above-mentioned instruction storage units in which the instruction stored in register 14 is to be stored. The information of the portion 15 is fed to a decoder 16 through line 51 to select a register in either of the instruction storage unit 1 or 2.

Reference numeral 13 designates a register which delivers a request signal to the memory unit, 17 another program counter for indicating the address of an instruction which is being executed at the central processor, and 25 an instruction register for storing an instruction read out from the instruction storage unit 1 or 2 to execute it at the central processor. Numerals 10 and 20 designate decoders which decode respectively the least significant two bits 7 and 18 in the program counter 6 6and 17 as well as the signals A and A produced by the buffer control unit 5, and which produce signals to appoint the addresses in the instruction storage units 1 and 2. Numerals 9, 11, 12, 19, 21, 22 and 24 designate gate circuits respectively.

Now, the operation of the system shown in FIG. 1 is described. In the normal state, the signals $A_1$ and $A_2$ produced by the buffer control unit 5 and respectively appearing on the lines 29 and 30 are identical signals, indicating that a particular one 30 the instruction storage units 1 and 2 is being used at that instant. An address signal stored in the program counter 6 is transmitted to the memory unit through line 36 along with the above-mentioned signal $A_1$ set in the portion 8 through lines 29 and 33. The least significant two bits 7 of the above address signal are supplied to the decoder 10 through line 41 along with the signal $A_1$ coming through line 34. Said least significant two bits 7 indicate one of the four registers contained in each of the instruction storage units 1 and 2, while the signal $A_1$ indicates one of the paired instruction storage units 1 and 2. Thus, the decoder 10 produces a signal on line 42 designating a register in the storage units in which the instruction of the above address is to be stored.

Each indicator part 3 or 4 of the registers in the instruction storage units 1 and 2 includes two bits, one of which is an indicator for indicating whether a request for an instruction to be stored in the relevant register has been dispatched to the memory unit or not (such an indicator is hereinafter referred to as a reserve indicator) and the other bit indicates that an instruction has been transferred from the memory unit and stored in the relevant register in the instruction storage unit (such an indicator is hereinafter referred to as an occupation indicator). Line 44 conveys the reserve indicators to the gate circuit 12, which selects out the reserve indicator of the particular register designated by the decoder 10 through the line 42, and if the selected indicator is "0" indicating that a request signal has not yet been produced, the signal is conveyed to the register 13 through line 45 to set the latter register, which in turn produces the request signal X. The output signal of the decoder 10 is also applied to the gate circuit 11 through line 43. The gate circuit is opened by a timing signal appearing on line 47 at an appropriate time after the occurrence of the request signal X, whereby a set signal is transmitted to the selected register in the instruction storage unit through line 48 to set the reserve indicator of the register. Thus, the register is reserved for the instruction for which a request signal is delivered to the memory unit.

Upon occurrence of a signal from the memory unit indicating receipt of the request signal and address, the register 13 is reset and the program counter 6 is counted up by one to the next number by a timing signal coming through line 40. Accordingly, the decoder 10 which decodes the least significant bits of the number in the program counter, now designates a register next to the hitherto designated one in the instruction storage unit. If the reserve indicator of the newly designated register happens to be "1," the occurrence of request signal will be withheld until the indicator turns to "0." While, if the reserve indicator is "O," the register 13 is immediately set to produce a new request signal.

An instruction read out from the designated address in the memory unit in response the the request signal is transferred to the register 14 through line 49 and is set therein. In this connection, the least significant two bits of the address and the reserve indicator which have been sent to the memory unit with the address signal are returned to the register 14 being accompanied by the instruction thereby to be stored in the portion 15 of the register 14. The 3-bits signal set in the portion 15 is applied to the decoder 16 through line 51 and decoded into a signal which designates the register in the instruction storage unit 1 or 2 in which register the instruction read out is to be set. In this manner, the said instruction which is applied to the storage units from the register 14 through line 50 is stored in the proper register under the control of the above-mentioned register-designating signal coming through line 52. At the same time, the last-mentioned signal sets the occupation indicator of the said register in the storage unit by the route of line 53 thereby to indicate the fact that an instruction is stored in the register.

It will be understood from the above description that the instructions are not necessarily required to be brought to the designated registers in the storage units in the order of the occurrence of the request signals. Therefore, a plurality of memory units having different process speeds can be connected to the system without the risk of adversely affecting the overall operation speed of the system.

Thus, the instruction storage unit 1 or 2, which has been designated by the signal $A_1$, continues to read out instructions from the memory units until every register in the storage unit stores an instruction.

On the other hand, there is set in the program counter 17 the address of an instruction which is being executed in the central processor. The least significant two bits 18 of the contents of this program counter 17 indicate the address of a register in the instruction storage units 1 and 2 with the signal $A_2$ which indicates the instruction storage unit storing the instruction now being executed. The said least significant two bits 18 are applied to the decoder 20 through line 59, while the signal $A_2$ also comes to the same decoder through line 30, and the decoder produces a signal designating the above-mentioned one register in the instruction storage units. The latter signal is applied to the gate circuit 22 through line 60 to select one portion of information stored in the above-mentioned designated register from among the information coming from the respective registers in the storage units through line 61. The instruction part of the information selected through the gate circuit 22 is conveyed to the instruction register 25 through line 62, while the indicator part selected through the least significant portion 23 of the gate circuit 22 is applied to a further gate circuit 24 through line 63. When both the reserve and occupation indicators of the said indicator part are "1" and a request signal X' for the next instruction comes from the central processor through line 69, the gate circuit lets pass the signal to set the instruction coming from the gate circuit 22 through line 62 in the instruction register 25, from which the instruction is transferred to the central processor through line 68 for execution. Upon completion of this execution, the program counter 17 is counted up by 1 to the next number by the timing signal applied through the line 58 and makes it possible for the next instruction to be taken out from the storage unit.

Meanwhile, the output signal of the decoder 20 is also applied to the gate circuit 21 through line 65 and it is let pass to the indicator portion 3 or 4 through line 67 in synchronization with a timing signal which comes through line 66 after the instruction is set in the instruction register 25. Thus, the reserve indicator and occupation indicator in the indicator portion of the relevant register are reset, and the register is ready to receive a new instruction from the memory units.

The normal operation of the instruction buffer of this invention has been described in the preceding paragraphs. Next, the operation in the case where a conditional branch occurs in an instruction of the program will be described.

If the central processor detects an instruction read out from the memory unit and transferred through the instruction storage unit and the register 25 to be a conditional branch instruction, the signal BI indicating the occurrence of a conditional branch instruction is sent to the buffer control unit 5 through line 26 and, at the almost same time, control signals are applied to the gate circuits 9 and 19 respectively through lines 38 and 56. As a result, the information stored in the program counters 6 and 17 are evacuated to auxiliary registers or the like (not shown) respectively through lines 37, 39 and 55, 57, and the address of the branch designated by the conditional branch instruction is set in the program counters 6 and 17 respectively through lines 35 and 54.

Upon receipt of the signal BI, the buffer control unit 5 reverses the signal $A_1$ so as to designate the other instruction storage unit (for example, 2) which has hitherto been idle. This signal $A_1$, being set in the portion 8 of the program counter 6, is sent to the memory unit along with the address signal and then returned to the register 14. Therefore, the instructions at the addresses of the branch (i.e., the new instructions) will be successively stored in the instruction storage unit hitherto not in use (for example, 2).

The central processor, having executed the conditional branch instruction, produces either the signal B indicating fulfillment of the branch condition or the signal NB indicating unfulfillment of the condition. If the signal NB is applied to the buffer control unit 5 through line 27, the buffer control unit produces the signal (for example, $R_2$ which resets all indicator portions (for example, 4) of the registers in that instruction storage unit (for example, 2) in which the above-mentioned instructions at the address of the branch are stored, and at the almost same time, the signal $A_1$ is again reversed and becomes the same as the signal $A_2$. Further, the previously evacuated information is returned to the respective program counters 6 and 17 from the auxiliary registers or the likes through lines 35 and 54 respectively and are set therein. Thus, the program is resumed at an instruction next to the conditional branch instruction.

On the other hand, if the signal B is applied to the buffer control unit 5 through line 28, the buffer control unit produces the signal (for example, $R_1$) which resets all indicator portions (for example, 3) of the registers in the instruction storage unit (for example, 1) initially designated by the signal $A_2$, and then the signal $A_2$ is reversed again to become the same as the previously reversed signal $A_1$. Therefore, the instructions of the branch are conditioned to be transferred to the central processor through the instruction register 25 with the aid of the least significant two bits 18 of the address set in the program counter 17 and the signal $A_2$.

In the above-described operation, it is possible as an alternative method to dispense with the step of evacuating the contents of the program counter 17 upon the appearance of the signal BI indicating the occurrence of a conditional branch instructions and to set the address of the branch coming through line 54 in the program counter 17 only when the signal B appears indicating the fulfillment of the branch condition. In such an arrangement, the gate circuit 19 may be eliminated, and only the contents of the program counter 6 are to be evacuated to the auxiliary register.

It will be understood that the control signals and timing signals applied to the respective circuit elements by way of the lines 38, 40, 47, 56, 58, 66 and 69 as described above are produced in a control unit respectively with predetermined timings and in response to control signals coming from the memory unit and the central processor, though the control unit is not shown in the drawings.

Figure 2:
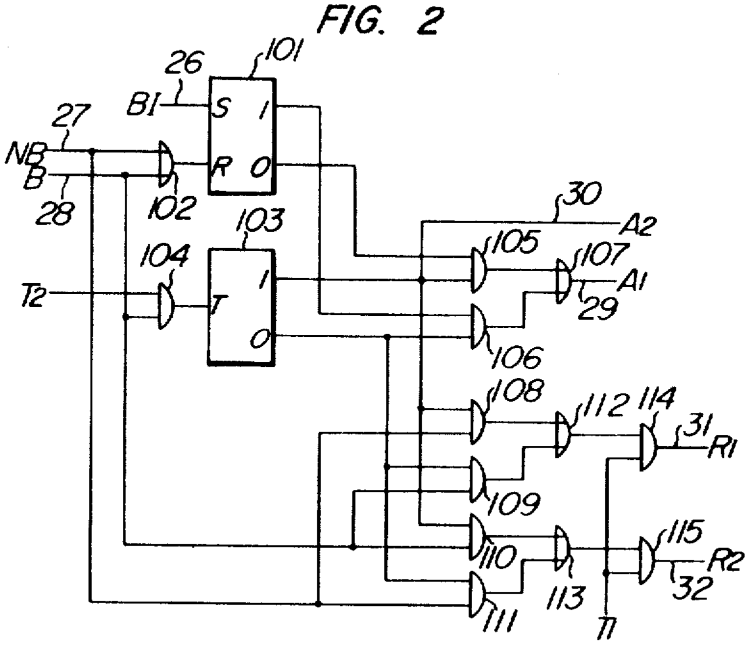
FIGS. 2 and 3 are logic circuit diagrams showing two different structures of the essential part of system shown in FIG. 1.

Referring to FIG. 2 which is an example of the logic circuit diagram of the buffer control unit 5 shown in FIG. 1, reference numeral 101 designates a register for storing the signal BI which indicates the occurrence of a conditional branch instruction. This register may be constituted of, for example, a flip-flop. The set-input terminal S of the said register 101 is fed with the signal BI, while the reset-input terminal R with the signal NB indicating the unfulfillment of the branch condition or the signal B indicating the fulfillment of the branch condition. Accordingly, the register 101 is set when a conditional branch instruction is detected at the central processor and it is reset when the central processor decides, as a result of the execution of the instruction, whether the program is to be branched or not. In this connection, if a further branch instruction will occur before the fate of the first branch instruction is decided, the central processor acts so as to withhold the signal BI until the decision of the fate of the first branch instruction.

Reference numeral 103 designates a register for indicating which one of the instruction storage units is in use at any one time. This register 103 may be constituted, for example, of a flip-flop, the state of which is reversed whenever a signal is applied to a trigger input terminal T thereof. If the signal B occurs indicating the fulfillment of the branch condition, the signal B is applied to the register 103 after being synchronized with the timing signal $T_2$ in the AND gate 104 and reverses the state of the register 103. The positive output of the register 103 is the previously mentioned signal $A_2$.

The negative output of the register 101 and the positive output of the register 103 are applied to an AND gate 105, while the positive output of the former and the negative output of the latter are applied to another AND gate 106. The respective outputs of the AND gates 105 and 106 are applied to an OR gate 107, the output of which is the previously mentioned signal $A_1$. Therefore, the signal $A_1$ is opposite to the signal $A_2$ when the register 101 is set, and it is the same as the signal $A_2$ when the same register is reset. Though the positive or negative state of the signals $A_1$ and $A_2$ may be assigned to either of the two instruction storage unit, it is assumed for the convenience of explanation in the following description that the signals $A_1$ and $A_2$ designate the storage unit 1 if it is negative state and the storage unit 2 if it is positive state.

It will be recalled that the buffer control unit, upon receipt of the signal NB, is to produce a signal for resetting the indicator parts of all registers in that instruction storage unit in which instructions of the branch program are stored, and upon receipt of the signal B, is to produce a signal for resetting all indicator parts in the other instruction storage unit. Thus, if the signal $A_2$ is negative state, the signal B causes the indicator parts 3 in the storage unit 1 to be reset, and the signal NB resets the indicator parts 4 in the storage unit 2. Similarly, if the signal $A_2$ is positive state indicating the storage unit 2, the occurrence of the signal B results in resetting the indicator parts 4, and the signal NB the indicator parts 3.

In order to effect the above causality, the buffer control unit includes the following logic circuits. That is, the positive output of the register 103 and the signal NB are applied to an AND gate 108 to obtain the logical product of them, while the negative output of the register 103 and the signal B are applied to an AND gate 109. The output of both AND gates are applied to an OR gate 112 and the logical sum is synchronized with the timing signal $T_1$ through an AND gate 114. In this manner, the signal $R_1$ for resetting the indicator parts 3 is produced. Similarly, the positive output of the register 103 and the signal B are applied to an AND gate 110, while the negative output of the same register and the signal NB are applied to an AND gate 111. The outputs of both AND gates are applied to an OR gate 113, the output of which is synchronized with the same timing signal $T_1$ through an AND gate 115. Thus, the reset signal $R_2$ for the indicator parts 4 is produced. The timing signal $T_1$ is applied prior to the timing signal $T_2$ when the signal NB or B occurs so that the register 103 is reversed after either of the indicator parts 3 or 4 is reset.

Figure 3:
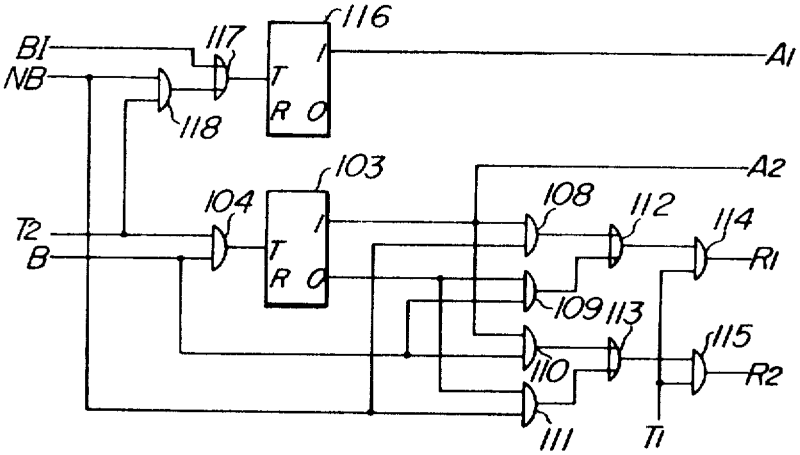

Referring to FIG. 3 which shows another example of the buffer control unit 5 shown in FIG. 1, there is shown registers 116 and 103 which hold the signals $A_1$ and $A_2$. The circuit of FIG. 3 is different from the circuit of FIg. 2 only in the point that the circuit of FIg. 3 is provided with the registers 116 having a trigger-input terminal T as the register 103, instead of the register 101 in FIG. 2, the signals BI and NB being applied to the said terminal T through an OR gate 117. Therefore, if the registers 116 and 103 are initially reset so that the signals $A_1$ and $A_2$ are mutually identical, the register 116 will be reversed by the signal BI which indicates the occurrence of a conditional branch instruction, thereby making the signal $A_1$ opposite to the signal $A_2$. Further, if the signal NB indicating the unfulfillment of the branch condition is applied to the register 116 through an AND gate 118 which is opened by the ting signal T , the register 116 is again reversed to make the signal $A_1$ identical to the signal $A_2$. On the contrary, if the signal B indicating the fulfillment of the branch condition is applied to the register 103 in synchronization with the timing signal $T_2$, this time the register 103 is reversed to make the signal $A_2$ the same as the signal $A_1$.

In FIG. 3, the circuits for producing the reset signals $R_1$ and $R_2$ are the same as those shown in FIG. 2.

Figure 4:
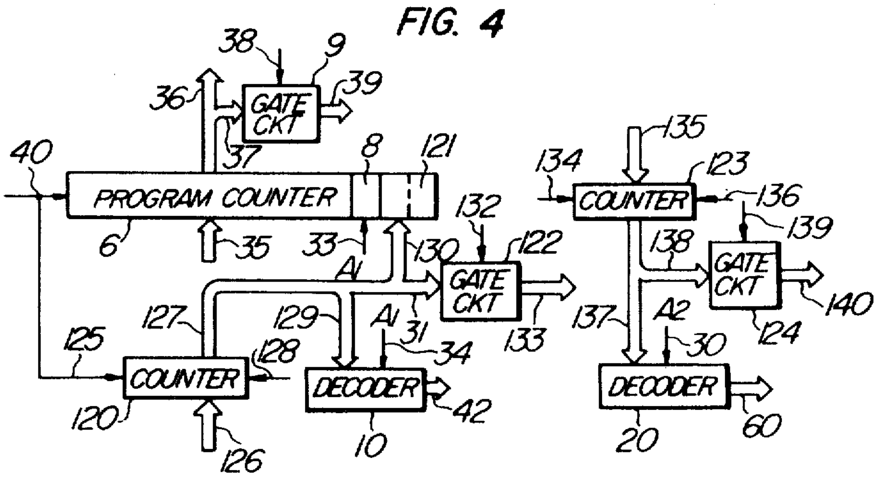
FIG. 4 is a schematic diagram showing essential portions of another embodiment of this invention.

FIG. 4 shows relevant portions of another embodiment of this invention. In this embodiment, the indication of a register in the instructions storage units is effected with additionally provided 2-bits counter 120 and 123, instead of using the least significant two bits of the program counters as in the first embodiment. Further, the program counter 6 is provided with an additional portion 121 in which the contents of the said indicator counters are stored, besides the portion 8 for storing the signal $A_1$, thereby indicating a register in the instruction storage units in which the instruction read out from the address in memory unit designated by the program counter is to be stored. The contents of the portions 8 and 121 are transferred to the memory unit along with the address and then returned to the register 14 shown in FIG. 1. Therefore, the instruction read out from the memory unit is transferred to the designated register in the instruction storage unit regardless of the least significant bits of the address. The output of the counter 120 is set into the said portion 121 of the program counter through line 127 and 130. The said output is also applied to the decoder 10 through line 129. Alternatively, the output of the counter 120 may be directly sent to the memory unit not by way of the portion 121. In such an arrangement, the portion 121 may be cancelled. The counter 120 is counted up by 1 to the next number, at the same time as the program counter 6 is counted up, by a control signal applied through line 125 after a signal indicating the receipt of the address signal is sent from the memory unit.

The counter 123 holds a signal for indicating a register in the instruction storage unit selected by the signal $A_2$, from which the instruction is to be transferred to the central processor. The output of this counter is applied to the decoder 20 through line 137, and the counter is counted up by 1 to the next number by a control signal applied through line 134 after the central processor produces a signal requesting the next instruction.

Upon the appearance of the signal BI indicating the occurrence of a conditional branch instruction, the contents of the counters 120 and 123 are evacuated to auxiliary registers respectively through the gates 122 and 124 which are opened by a control signal applied through lines 132 and !139 and by the route of lines 133 and 140. After that, the counters 120 and 123 are reset by a control signal applied through lines 128 and 136. Thus, the instructions of the branch program are stored in the registers of the instruction storage unit 1 or 2 in the sequential order starting from the first register. In the case where the branch condition is not fulfilled, the previously evacuated contents are again set in the counters 120 and 123 respectively through lines 126 and 135 so that the original program can be resumed. In FIG. 4, the same components and circuits as those shown in FIG. 1 are not shown. However, it should be noted that in the embodiment of FIG. 4, the program counter 17 may be omitted, as the contents of the said counter can be known from the contents of the program counter 6 and counters 120 and 123.

Figure 5:
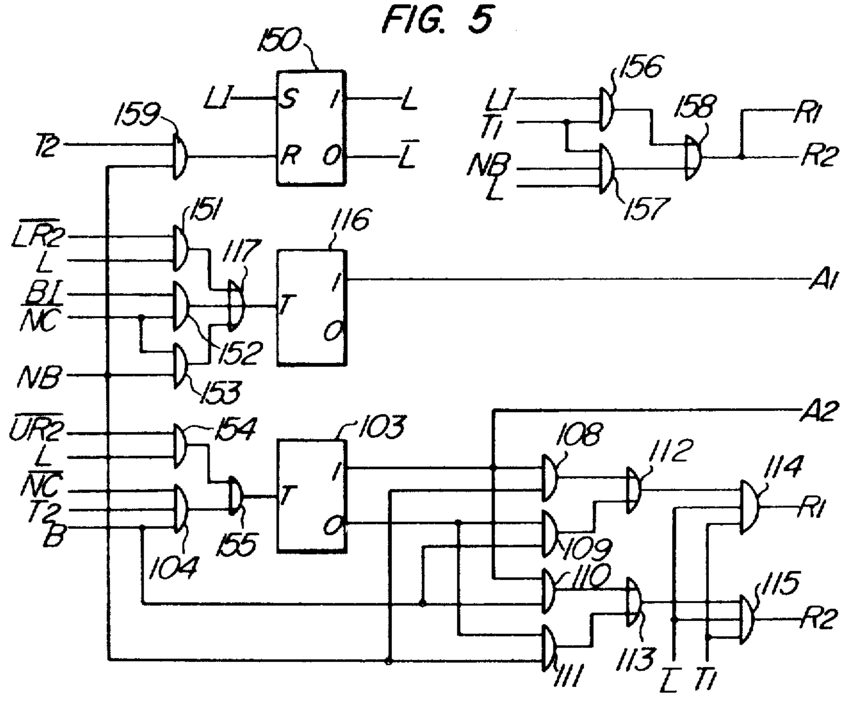
FIG. 5 is logic circuit diagrams showing essential portions of still another embodiment of this invention.

FIG. 5 shows the relevant portions of still another embodiment of this invention. In this embodiment, all instructions in a small loop of the program can be stored in the pair of instruction storage units 1 and 2 when such a small loop takes place.

The instruction storage unit 1 or 2 is often found to be too small to store the whole of a loop of program, if the two units are used separately. To solve this problem, in this embodiment, the instruction storage units 1 and 2 are utilized as a single continuous storage unit while a loop of program occurs. Thus, not resetting the indicator parts, the instruction storage unit can store the instructions of a whole loop of a considerable length. In order to operationally unite the two instruction storage units into one continuous unit, it is only necessary to modify the buffer control unit 5 shown in FIG. 1.

As shown in FIG. 5, the buffer control unit of this embodiment is provided with an additional register 150 for holding a signal LI which indicates the occurrence of a loop of program, besides the circuits shown in FIg. 3. This register 150 is set by the said signal LI and is reset by the signal MB which indicates the unfulfillment of the branch condition i.e., termination of the loop. Accordingly, while the program is in a loop, the register is in the set state, producing a signal L as the positive output and a signal $\overline{L}$ i.e., reversed L signal as the negative output.

In order to effect the consolidation of the two instruction storage units while the program is in a loop, overflow signals of the least significant bits 7 of the program counter 6 and the similar bits 18 of the program counter 17 shown in FIG. 1, or overflow signals of the counters 120 and 123 shown in FIG. 4 are applied respectively to the registers 116 and 103 to thereby constitute a counter which is to designate the whole registers throughout the two instruction storage units 1 and 2. Namely, the negative output $\overline{LR_2}$of the flip-flop at the second least significant bit of the program counter 6 in FIG. 1 or the counter 120 in FIG. 4 and the positive output L of the register 150 are applied to an AND gate 151 and the resultant logical product is applied to the trigger-input terminal T of the register 116 through an OR gate 117. While, the negative output $\overline{UR_2}$ of the flip-flop at the second least significant bit of the program counter 17 shown in FIG. 1 or the counter 123 in FIG. 4 and the positive output L of the register 150 are applied to an AND gate 154 and the resultant logical product is applied to the trigger-input terminal T of the register 103 through an OR gate 155.

If a loop stored in the instruction storage units 1 and 2 is so small as to return within, for example four double words, or on the contrary if the loop is so large as to return to, for example eight double words before, it may happen that the conditional branch instruction and the instruction at the address of the branch are stored in the identical one of the storage unit 1 or 2. In such a case, the signals $A_1$ and $A_2$ should not be reversed even if the signal BI, NB or B is applied to the instruction control unit. Whether the instruction at the address of the branch are in the same storage unit as the conditional branch instruction is stored, can be determined when the said branch instruction is inquired in the central processor as regards whether the branch is a small loop or not. That is, in the case of the embodiment shown in FIG. 1, it is determined only by detecting whether the third least significant bit of the address of the conditional branch instruction is the same as the corresponding bit of the address of the instruction of the branch or not. In the case of the embodiment shown in FIG. 4, it is only required to detect whether the branch returns within four double words in the program. In this manner, a signal NC indicating that the two instruction storage units are not to be exchanged in accordance with the occurrence of the branch, is produced in the central processor. The reversed signal $\overline{NC}$ of the above signal NC is applied to AND gates 152, 153 and 104 to make logical products respectively by the signals BI, NB and B. Thus, the inversion of the signals $A_1$ and $A_2$ is prevented.

As previously stated, when a small loop occurs in the program, it is required to read out the whole instructions in the loop from the memory unit and to store them in the instruction storage units 1 and 2, the instructions being read out from the storage units and transferred to the central processor in repeated cycles so far as the loop program does not come to the end. To meet this requirement, the indicator parts 3 and 4 of the instruction storage units 1 and 2 are not reset during the loop cycle nor re-read-out of instructions from the memory unit is performed. For this purpose, the signal $\overline{L}$ is applied to the AND gates 114 and 115 respectively as an input thereof so that the reset signal $R_1$ or $R_2$ is not produced during the loop cycle. Further, as the indicator parts 3 and 4 should be all reset when a loop cycle occurs and also when the loop cycle comes to the end, the logical product of the signal LI and the timing signal $T_1$ produced through an AND gate 156 and another logical product of the signals NB, L and the timing signal $T_1$ produced through an AND gate 157, are applied to an OR gate 158. Thus, the reset signals $R_1$ and $R_2$ are produced as the output of the OR-gate 158. It will be noted that the signal NB which is the reset input of the register 150 is synchronized with the timing signal $T_2$ in an AND gate 159. It is because the register 150 should be reset to change the signal L to "0," only after the reset signals $R_1$ and $R_2$ are produced in synchronization with the timing signal $T_1$.

Further, it is necessary to inhibit the output of the gate circuit 21 (an AND gate) shown in FIG. 1 during a loop cycle so as to prevent the indicator parts 3 and 4 from being reset. This is achieved by providing an AND gate on the line 66 so as to obtain a logical product of the timing signal appearing on the line 66 and the negative signal $\overline{L}$ of the register 150 shown in FIG. 5, thereby preventing the said timing signal from being applied to the gate circuit 21 during the loop cycle.

If another branch instruction other than those forming a loop appears in a loop, the central processor withholds the signal BI until the branch condition is fulfilled because no storage means for holding the instructions of the branch is left; and the loop is reset to effect the branch only after the branch condition is fulfilled.

What we claim is:

1. An instruction buffer system comprising a pair of symmetrical instruction storage means for storing instructions read out from a memory unit in a selected one of said pair of instruction storage means until said instructions are taken out to be executed at the central processor; buffer control means for normally designating a first one of said pair of storage means for storing an instruction read out from the memory unit, but designating the second one of said pair of storage means for storing an instruction at the address of branch read out from the memory unit when the central processor detects an instruction taken out from said first storage means to be a conditional branch instruction, said buffer control means selecting said second or first storage means respectively depending on whether the branch condition of said conditional branch instruction is fulfilled or not; means for successively writing instructions read out from the memory unit into the storage means selected under the control of said buffer control means; and readout means for taking out said instructions from said selected storage means to directly transfer them to the central processor.

2. An instruction buffer system as defined in claim 1, wherein said buffer control means comprises a first indicating means for indicating that one of said instruction storage means in which the instructions to be transferred to the central processor are stored; a second indicating means for normally indicating that one of said instruction storage means into which instructions read out from the memory are to be stored but indicating the other instruction storage means until the fate of the branch condition is decided whenever a conditional branch instruction is detected by the central processor; and means for invalidating the instructions stored in the one of the instruction storage means indicated by said first or second indicating means respectively depending on that the branch condition of said conditional branch instruction is fulfilled or not.

3. An instruction buffer system as defined in claim 2, wherein said first indicating means comprises a flip-flop circuit which reverses the outputs thereof each time when said flip-flop circuit receives from the central processor a signal indicating that the branch condition of said conditional branch instruction is fulfilled.

4. An instruction buffer system as defined in claim 1, wherein each of said pair of instruction storage means comprises a plurality of registers.

5. An instruction buffer system as defined in claim 4, wherein said means for writing instructions read out from the memory unit comprises means for designating that one of said registers in which the next instruction is to be written, and means for selecting said designated register.

6. An instruction buffer system as defined in claim 4, wherein said readout means comprises means for designating one of said registers in which instructions to be read out to the central processor are stored, and means for selecting said designated register in order to read out the instruction stored therein.

7. An instruction buffer system as defined in claim 4, wherein each of said registers comprises a part for storing an instruction, a reserve indicator part which indicates whether a signal requesting the instruction has been dispatched to the memory unit or not, and an occupation indicator part which indicates whether the requested instruction has been stored in said register or not.

8. An instruction buffer system as defined in claim 2, wherein said buffer control means includes loop control means which is controlled by a signal generated in the central processor and indicating the detection of a small loop by the central processor, so as to cause said pair of instruction storage means to function as a single continuous storage means to prevent instructions stored in said storage means from being invalidated while said small loop exists in the program.

9. An instruction buffer system as defined in claim 5, which further includes means for controlling the writing of an instruction read out from the memory unit to the instruction storage means according to an address signal of a register in the instruction storage means, said address signal being transferred to the memory unit along with a signal for requesting an instruction, and then returned along with the instruction read out from the memory unit.

10. An instruction buffer according to claim 2, wherein each of said pair of instruction storage means comprises a plurality of registers, said means for writing instructions read out from said memory unit comprises means for designating a specific one of said registers in which the next instruction is to be written, and means for selecting said designated register.

11. An instruction buffer in accordance with claim 10, wherein said readout means comprises means for designating one of said registers in which instructions to be read out to the central processor are stored, and means for selecting said designated register in order to read out the instruction stored therein.

12. An instruction buffer in accordance with claim 11, wherein each of said registers comprises a portion for storing an instruction, a reserve indicator portion for indicating whether a signal requesting the instruction has been dispatched to the memory unit and an occupation indicator portion which indicated whether the requested instruction has been stored within said register.

13. An instruction buffer in accordance with claim 12, further including means for controlling the writing of an instruction read out from said memory unit in the instruction storage means in accordance with an address signal of a register in the instruction storage means, said address signal being transferred to said memory unit together with a signal for requesting an instruction, and being returned with the instruction read out from said memory unit.